US009103360B2

(12) United States Patent
Kim et al.

(10) Patent No.: US 9,103,360 B2
(45) Date of Patent: Aug. 11, 2015

(54) MICROACTUATOR USING BUBBLE GROWTH AND DESTRUCTION

(75) Inventors: Sung-Il Kim, Daejeon (KR); Ki-Ho Park, Daejeon (KR); Won-Pyo Chun, Daejeon (KR); Kye-Jung Lee, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 174 days.

(21) Appl. No.: 14/113,972

(22) PCT Filed: May 11, 2012

(86) PCT No.: PCT/KR2012/003689
§ 371 (c)(1),
(2), (4) Date: Oct. 25, 2013

(87) PCT Pub. No.: WO2012/165773
PCT Pub. Date: Dec. 6, 2012

(65) Prior Publication Data
US 2014/0047823 A1 Feb. 20, 2014

(30) Foreign Application Priority Data

May 31, 2011 (KR) .......................... 10-2011-0052325

(51) Int. Cl.
*F01P 1/00* (2006.01)
(Continued)

(52) U.S. Cl.
CPC ................ *F15B 21/042* (2013.01); *F03G 7/06* (2013.01); *F15B 15/00* (2013.01); *F15B 2015/208* (2013.01); *Y10T 137/2196* (2015.04)

(58) Field of Classification Search
CPC .. F15B 21/042; F15B 15/00; F15B 2015/208; F03G 7/06; Y10T 137/2196
USPC ........................................... 60/530, 508–515
See application file for complete search history.

(56) References Cited

U.S. PATENT DOCUMENTS 3,254,845 A * 6/1966 Schlosser ...................... 239/332
3,798,895 A * 3/1974 Meijer et al. ................... 60/530
5,367,878 A * 11/1994 Muntz et al. ................... 60/512
(Continued)

FOREIGN PATENT DOCUMENTS

JP          05-106615 A      4/1993
JP          11-006403 A      1/1999
JP          2004-225910 A    8/2004
KR          10-0804686 B1    2/2008

*Primary Examiner* — Hoang Nguyen
(74) *Attorney, Agent, or Firm* — Rabin & Berdo P.C.

(57) ABSTRACT

Disclosed is a microactuator using growth and destruction of bubbles including a first chamber provided with a heating plate installed at an exterior of a bottom surface of the first chamber to generate heat, and filled with a first liquid working fluid such that bubbles are caused, by heat, to grow at an interface of a cavity on an inner surface of the first chamber to be heated, a second chamber provided with a heating plate installed at an exterior of a bottom surface of the second chamber to generate heat, and filled with a second liquid working fluid such that bubbles are caused, by heat, to grow at an interface of a cavity on an inner surface of the second chamber to be heated, a connection path to connect the first chamber and the second chamber to each other, the connection path being provided therein with a moving member adapted to isolate the first and second chambers from each other and to move when internal pressure changes according to growth and destruction of the bubbles, a first subline to connect the connection path to the second chamber such that the first working fluid moves the moving member to one side and is guided to the second chamber according to increase in the internal pressure by growth of the bubbles in the first chamber, a second subline to connect the connection path to the first chamber such that the second working fluid moves the moving member to the other side and is guided to the first chamber according to increase in internal pressure by growth of the bubbles in the second chamber, and a plurality of cooling means installed on the first subline and the second subline to destroy bubbles produced in the first and second chambers.

3 Claims, 4 Drawing Sheets

(51) Int. Cl.
*F01B 1/00* (2006.01)
*F02G 1/02* (2006.01)
*F15B 21/04* (2006.01)
*F15B 15/00* (2006.01)
*F03G 7/06* (2006.01)
*F15B 15/20* (2006.01)

(56) References Cited

U.S. PATENT DOCUMENTS

2005/0046663 A1* 3/2005 Silverbrook .................... 347/20
2005/0221281 A1* 10/2005 Ho .................................. 435/4
2013/0074488 A1* 3/2013 McBride et al. ................ 60/508

* cited by examiner (A)

(B)

MICROACTUATOR USING BUBBLE GROWTH AND DESTRUCTION

BACKGROUND OF THE INVENTION

1. Field of the Invention

The present invention relates to a microactuator using growth and destruction of bubbles that is broadly applicable to micro-size systems and actuators, and more particularly to a microactuator using growth and destruction of bubbles which ensures rapid response of a moving member by allowing change of internal pressure according to growth and destruction of bubbles at the interface of a cavity, enables production of high power output through high internal pressure through a simple structure, and enables precise control of the moving member through adjustment of the internal pressure of the chamber and the speed of a working fluid filling the chamber according to the size and rate of growth of bubbles.

2. Description of the Related Art

In general, microminiaturized actuators can be used in micro-devices and in fields requiring high precision control. These microminiaturized actuators are drawing attention in many fields including biotechnology, medicine, war, environmental technology, and chemical processes.

When miniaturized, devices can not only operate precisely and overcome spatial constraints, but also can be applied to micro-robots for medical and military use. Accordingly, designing of microminiaturized systems have been attempted for decades.

Such microminiaturized devices have a size reduced to millimeter scale or below. Development of microelectromechanical systems (MEMS) has enabled realization of such microsystems. Nowadays, MEMS manufacturing technology is used in commercial manufacture and research into compact sensor modules, compact test devices, medical machines, high precision machines, high-tech military equipment, and inkjet printer heads.

Many microdevices require use of an actuator for supply of driving power. Each actuator provides certain magnitudes of displacement, force, and frequency. Types of driving force for the actuator include electrostatic force, piezoelectric power, thermal energy, and magnetic force.

TABLE 1

| Type | Force | Displacement | Frequency | Constraint |
| --- | --- | --- | --- | --- |
| Electrostatic force | Weak | Large or Small | Large | Weak force |
| Piezoelectric power | Strong or Weak | Large or Small | Large | Device |
| Thermal energy | Strong | Large | Small | Low frequency |
| Magnetic force | Weak | Small | Large or Small | Weak force |

As shown in Table 1, actuators using electrostatic force and magnetic force actuators produce relatively weak power. As to actuators using piezoelectric power, piezoelectric materials are not well suited to MEMS manufacturing technology. Actuators using thermal energy provide strong force and large displacement. However, due to slow thermal diffusion, they have a relatively low frequency on the order of hundreds of hertz.

Particularly, a representative device of an actuator using thermal energy is an inkjet head. The inkjet head produces bubbles by heating a liquid introduced into a small chamber using a heating plate and uses the produced bubbles as driving force to spray liquid droplets onto the surface of a sheet of paper through a nozzle, performing the printing operation.

Actuators utilizing thermal energy are advantageous in that they produce large force and displacement and are easy to manufacture. However, their low frequency related to heat dissipation is recognized as disadvantageous.

SUMMARY OF THE INVENTION

Therefore, the present invention has been made in view of the above problems, and it is an object of the present invention to provide a microactuator using growth and destruction of bubbles which ensures very fast response of a moving member by inducing change in the internal pressure according to growth and destruction of bubbles in a very short time.

It is another object of the present invention to provide a microactuator using growth and destruction of bubbles which can provide high output power of a moving member through change in internal pressure according to growth and destruction of bubbles, and provide a structure enabling precise control by controlling the rate of change of bubbles through heating by a heating plate.

In accordance with the present invention, the above and other objects can be accomplished by the provision of a microactuator using growth and destruction of bubbles including a first chamber provided with a heating plate installed at an exterior of a bottom surface of the first chamber to generate heat, and filled with a first liquid working fluid such that bubbles are caused, by heat, to grow at an interface of a cavity on an inner surface of the first chamber to be heated, a second chamber provided with a heating plate installed at an exterior of a bottom surface of the second chamber to generate heat, and filled with a second liquid working fluid such that bubbles are caused, by heat, to grow at an interface of a cavity on an inner surface of the second chamber to be heated, a connection path to connect the first chamber and the second chamber to each other, the connection path being provided therein with a moving member adapted to isolate the first and second chambers from each other and to move when internal pressure changes according to growth and destruction of the bubbles, a first subline to connect the connection path to the second chamber such that the first working fluid moves the moving member to one side and is guided to the second chamber according to increase in the internal pressure by growth of the bubbles in the first chamber, a second subline to connect the connection path to the first chamber such that the second working fluid moves the moving member to the other side and is guided to the first chamber according to increase in internal pressure by growth of the bubbles in the second chamber, and a plurality of cooling means installed on the first subline and the second subline to destroy bubbles produced in the first and second chambers.

Preferably, an opening of the second chamber connected to the first subline and an opening of the first chamber connected to the second subline may be provided with a check valve.

Preferably, a plurality of stoppers may be provided at both sides of the connection path to prevent the moving member from escaping from the connection path.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Reference will now be made in detail to the embodiments of the present invention, examples of which are illustrated in the accompanying drawings.

Figure 1:
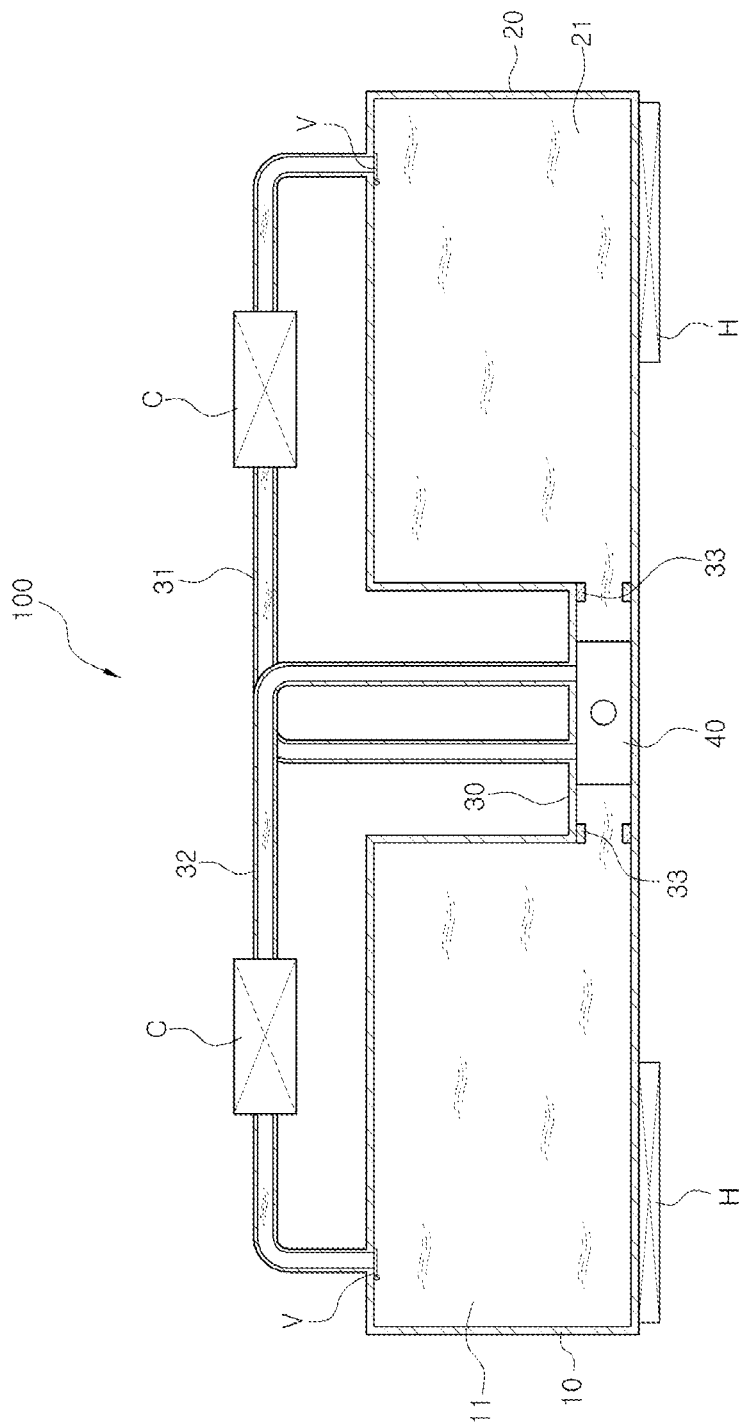
FIG. 1 is a conceptual view illustrating a microactuator using growth and destruction of bubbles according to one embodiment of the present invention.

FIG. 1 is a conceptual view illustrating a microactuator using growth and destruction of bubbles according to one embodiment of the present invention.

As shown in FIG. 1, the present invention relates to a microactuator using growth and destruction of bubbles that is broadly applicable to microscale systems and actuators. More specifically, the microactuator using growth and destruction of bubbles according to the present invention ensures rapid response of a moving member by allowing change of internal pressure according to growth and destruction of bubbles at the interface of a cavity, enables production of high output power by obtaining high internal pressure through a simple structure, and enables precise control of the moving member through adjustment of the internal pressure of the chamber and the speed of a working fluid filling the chamber according to the size and rate of growth of bubbles.

A microactuator 100 using growth and destruction of bubbles includes a first chamber 10 and a second chamber 20 which have the same volume and face each other. The microactuator 100 also includes a moving member 40 disposed in a connection path 30 connecting the chambers 10 and 20 to each other. The microactuator 100 can be used as an actuator when the moving member 40 performs minute mechanical displacement by moving according to change in the internal pressure of a working fluid filling the chambers 10 and 20.

The microactuator 100 includes four parts, the first and second chambers 10 and 20 having the same volume, the connection path 30 to connect the chambers 10 and 20 to each other, the moving member 40 disposed in the connection path 30, a first subline 31 to connect the connection path 30 to the second chamber 20, a second subline 32 to connect the connection path 30 to the first chamber 10, and a cooling means C installed outside the sublines 31 and 32.

Herein, the first chamber 10 is filled with a first liquid working fluid 11 and is provided with a heating plate H installed at the outside of the bottom surface thereof to produce heat. Similarly, the second chamber 20 is filled with a second liquid working fluid 21 and provided with a heating plate H installed on the outside of the bottom surface thereof to produce heat.

The heating plates H heat the chambers 10 and 20, thereby causing growth of bubbles at the interface of the cavity. Thereby, the heating plates H induce change in the internal pressures of the first and second working fluids 11 and 21.

In addition, the connection path 30 is formed between the first chamber 10 and the second chamber 20 to connect the first chamber 10 and the second chamber 20 to each other. Thereby, the first chamber 10 and the second chamber 20 are disposed to face each other.

The moving member 40 is disposed in the connection path 30 such that the first chamber 10 and the second chamber 20 are isolated from each other, facing each other. The moving member 40 is caused, by change in internal pressures of the first working fluid 11 and the second working fluid 21 filling the respective chambers 10 and 20, to reciprocate in the connection path 30 to perform minute mechanical displacement.

The first subline 31 connects the connection path 30 to the second chamber 20 such that the first working fluid 11 moves the moving member 40 to one side and is then guided to the second chamber 20 according to increase in the internal pressure of the first chamber 10 by growth of bubbles in the first chamber 10. The second subline 32 connects the connection path 30 to the first chamber 10 such that the second working fluid 21 moves the moving member 40 to the other side and is then guided to the first chamber 10 according to increase in the internal pressure of the second chamber 20 by growth of bubbles in the second chamber 20.

The cooling means C may include fins for heat dissipation installed outside the sublines 31 and 32 or a heat exchanger installed inside or outside the sublines 31 and 32.

Each cooling means C is installed on the first subline 31 and the second subline 32 to dissipate heat from the first working fluid 11 and the second working fluid 21 in the chambers 10 and 20. Through the cooling means C installed on the first and second sublines 31 and 32, the first and second working fluids 11 and 21 can be cooled and thus bubbles growing in the chambers 10 and 20 may be quickly destroyed. Accordingly, the moving member 40 in the connection path 30 is allowed to move to the left and right, having a high frequency.

The opening of the second chamber 20 connected to the first subline 31 and the opening of the first chamber 10 connected to the second subline 32 are respectively provided with a check valve V.

The check valves V prevent backflow of the working fluids to the first subline 31 and the second subline 32 respectively connected to the chambers 10 and 20 according to change in internal pressure.

Accordingly, when the internal pressures of the working fluids 11 and 21 increase, the check valves V guide the working fluids 11 and 21 only to the sublines 31 and 32 connected to the connection path 30.

Additionally, both sides of the connection path 30 are provided with a stopper 33 to prevent the moving member 40 from escaping from the connection path 30. In addition, the stoppers 33 enable precise control of the moving member 40.

Hereinafter, operation of a microactuator using growth and destruction of bubbles according to the present invention will be described in detail with reference to the accompanying drawings.

Figure 2:
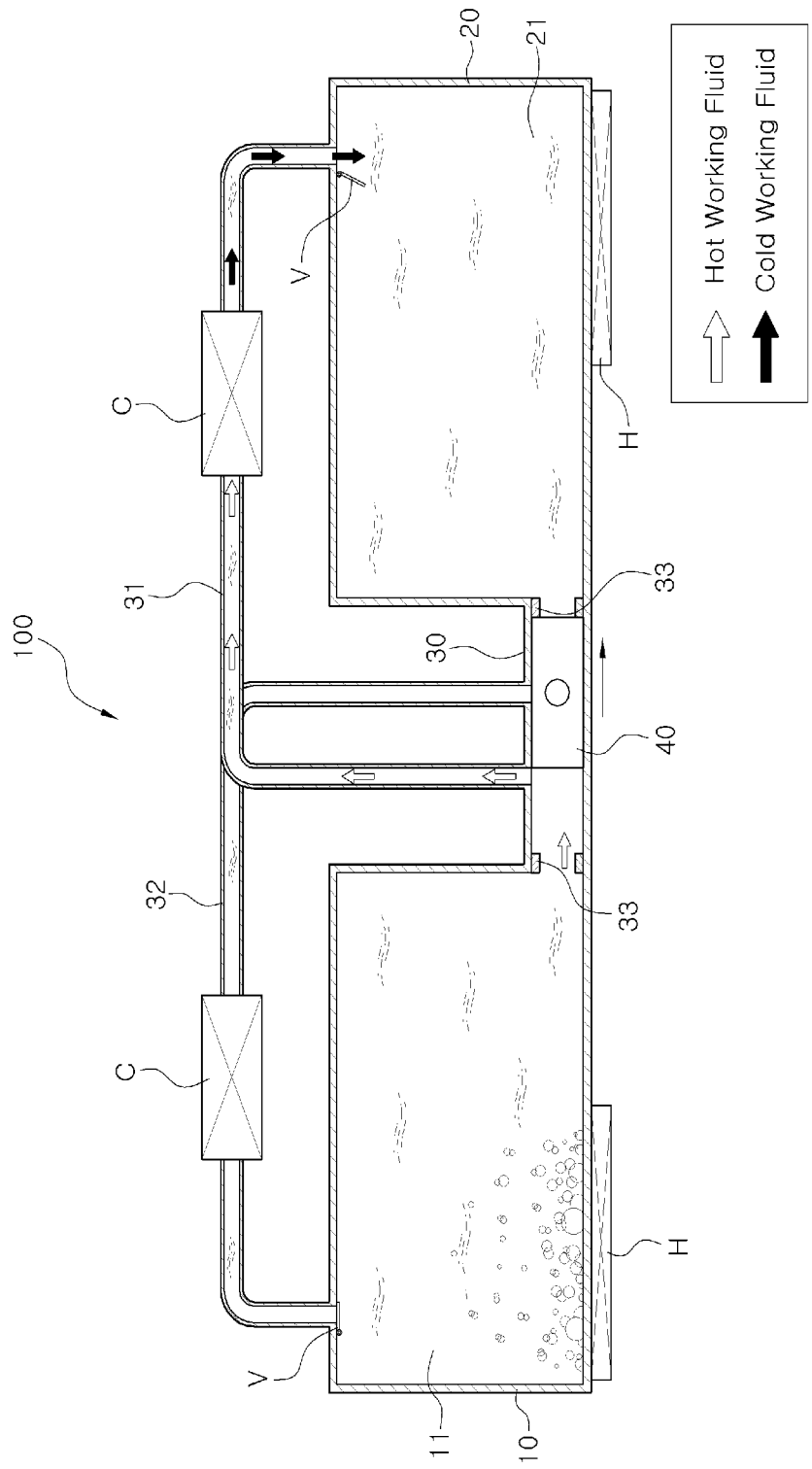
FIGS. 2 and 3 are views illustrating operation of a microactuator using growth and destruction of bubbles according to one embodiment of the present invention.
Figure 3:
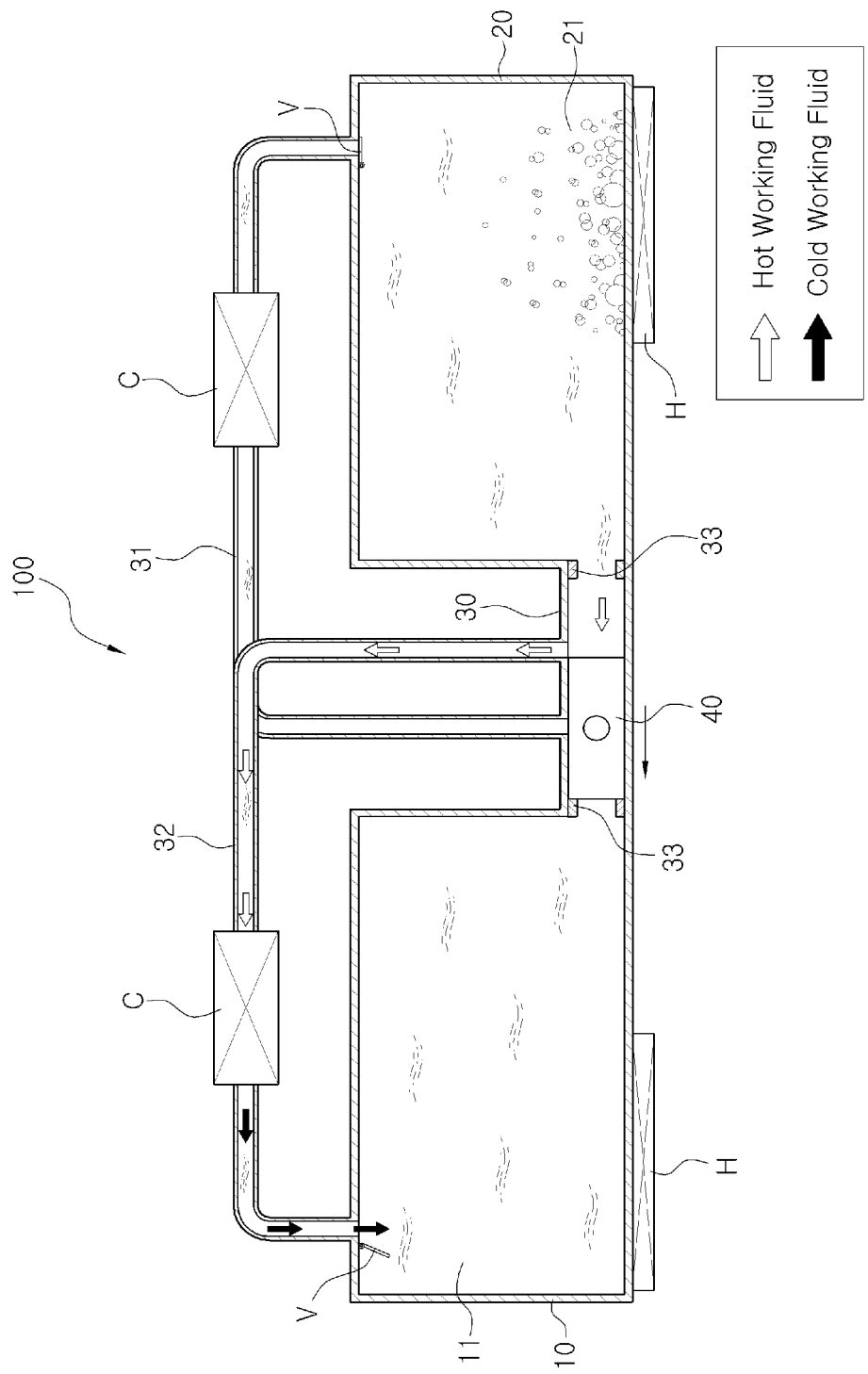

FIGS. 2 and 3 are views illustrating operation of a microactuator using growth and destruction of bubbles according to one embodiment of the present invention.

As shown in FIG. 1, the moving member 40 is disposed at the center of the connection path 30 in normal times to close the first subline 31 and the second subline 32.

When the first chamber 10 is heated through the heating plate H as shown in FIG. 2, the internal pressure of the first working fluid 11 is increased as bubbles are allowed to grow at the interface of the cavity.

Then, the first working fluid 11 moves the moving member 40 disposed in the connection path 30 to one side. As the moving member 40 moves to one side, the first subline 31 is opened.

Thereafter, the first working fluid 11 moving along the first subline 31 is cooled by the cooling means C installed outside the first subline 31 and introduced into the second chamber 20 to join the second working fluid 21 in the second chamber 20. At the same time, operation of the heating plate H provided to the first chamber 10 is stopped and thereby growth of bubbles is stopped.

The cooled first working fluid quickly destroys the produced bubbles in the second chamber 20, lowering the internal pressure to promote movement of the moving member 40 in the connection path 30.

When operation of the heating plate H provided to the first chamber 10 is stopped, the heating plate H provided to the bottom surface of the second chamber 20 is operated as shown in FIG. 3, allowing bubbles to grow in the second chamber 20. Thereby, the internal pressure of the second working fluid 21 is increased to move the moving member 40 to the other side.

Then, the second working fluid 21 is moved along the opened second subline 32 and cooled by the cooling means C installed on the second subline 32, and then joins the first working fluid 11 in the first chamber 10.

As the processes shown in FIGS. 2 and 3 are repeated, the moving member 40 is quickly moved to the left and right sides in the connection path, enabling production of high output with a high frequency.

To allow the present invention to operate, time required for generation, growth and destruction of bubbles, the volume of a bubble and the cooling performance of the cooling means need to be estimated.

First, generation of bubbles will be described in relation to the interface of the cavity present on the inner surface of the chamber to be heated.

Figure 4:
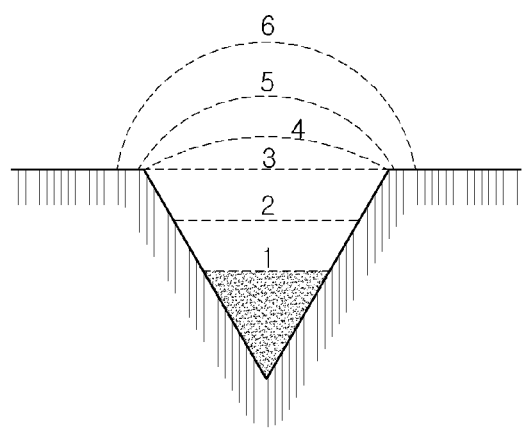
FIG. 4 is a conceptual view illustrating creation of a bubble nucleus in a cavity and change in volume and degree of superheat.
Figure 4:
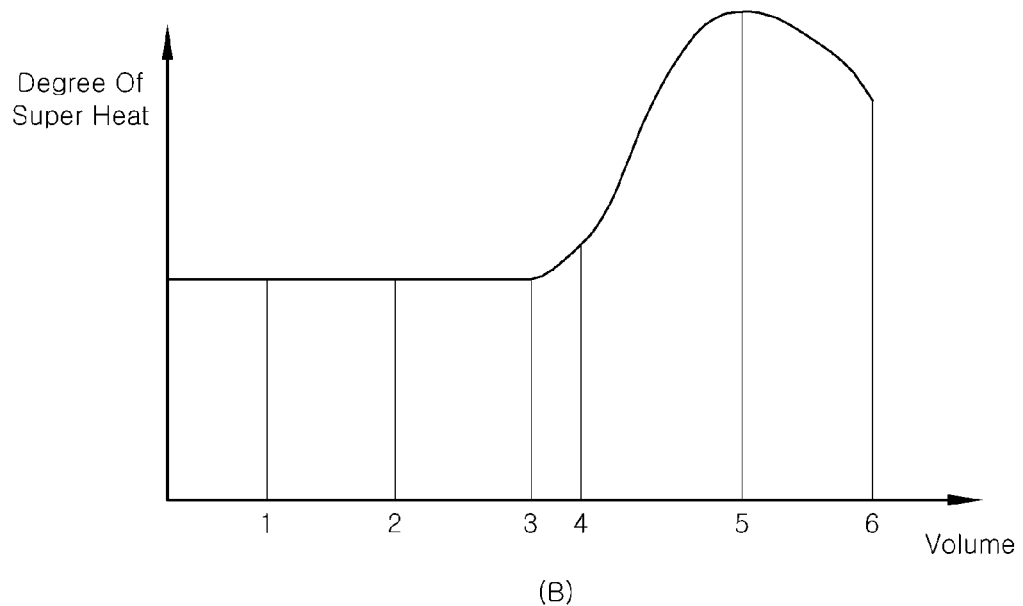

As shown in FIGS. 4(A) and 4(B), as the temperature of the heated surface increases, the interface in the cavity moves upward and reaches the inlet of the cavity. As the vapor pressure in the cavity increases, the interface becomes convex. When the temperature of the liquid around the interface successively increases beyond the saturated temperature by a degree of superheat corresponding to the radius of curvature of the interface, bubbles continue to grow.

When the nucleus of a bubble is larger than at equilibrium, the bubble spontaneously grows. The growth of bubbles is dominated by inertia of the liquid around the bubbles at the initial stage of the growth, and by the rate of conduction heat transfer, which determines the rate of evaporation of the liquid at the vapor-liquid interface at the later stage. The process of initial growth of bubbles is determined by the following mechanical energy equation.

$$R(t) = \frac{2\Delta T_{sat} k_f}{h_{fg} \rho_g} \sqrt{\frac{3t}{\pi \alpha_f}} \qquad \text{[Equation 1]}$$

Herein, $\alpha_f$ is the thermal diffusivity of the liquid, $T_{sat}$ is the saturation temperature, $\rho_g$ is the density of a gas, $h_{fg}$ is the phase change enthalpy, and $k_f$ is the thermal conductivity of the liquid.

Additionally, the separation diameter and frequency of bubbles separated from the heated surface greatly vary depending on the process of formation of bubbles.

Forces influencing the behavior of the bubbles at the later stage of bubbles may include buoyancy to separate the bubbles from the heated surface, drag in fluid mechanics, and forces obstructing separation of bubbles including surface tension and the fluid inertia.

The rate of growth of bubbles and the inertia of the liquid according to this rate greatly depend upon the degree of superheat of the liquid, and are inversely proportional to the size of the active cavity, and are determined by the following mechanical energy equation (Equation 2 or 3).

$$fD_b \langle 0.59 \left( \frac{\sigma g (\rho_f - \rho_g)}{\rho_g^2} \right)^{\frac{1}{4}} \qquad \text{[Equation 2]}$$

$$Eo^{1/2} = CJa^{*5/4}, \qquad \text{[Equation 3]}$$

$$Eo = \frac{g(\rho_f - \rho_g) D_b^2}{\sigma}$$

$$Ja^* = \frac{\rho_f c_{pf} T_{sat}}{\rho_g h_{fg}}$$

Herein, $D_b$ is the diameter of a bubble, $c_{pf}$ is the specific heat of the liquid, and C is $1.5 \times 10^{-4}$ when the working fluid is water, and $4.56 \times 10^{-4}$ for other fluids That is, using Equations 1, 2 and 3, time required for generation, growth and destruction of bubbles, the volume of a bubble and the cooling performance of the cooling means can be estimated. Thereby, the rate of change of bubbles can be controlled through the heat source of the heating plate, and therefore high precision control is possible.

As is apparent from the above description, according to one embodiment of the present invention, a microactuator using growth and destruction of bubbles can ensures very fast response of a moving member by inducing change in internal pressure according to growth and destruction of bubbles in a very short time, thereby increasing actuation frequency of a moving member.

In addition, a microactuator using growth and destruction of bubbles according to one embodiment of the present invention can provide high output power of a moving member through change in the internal pressure according to growth and destruction of bubbles, and provide a structure enabling precise control by controlling the rate of change of bubbles through a heat source of a heating plate.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A microactuator using growth and destruction of bubbles comprising:
    a first chamber provided with a heating plate installed at an exterior of a bottom surface of the first chamber to generate heat, and filled with a first liquid working fluid such that bubbles are caused, by heat, to grow at an interface of a cavity on an inner surface of the first chamber to be heated;
    a second chamber provided with a heating plate installed at an exterior of a bottom surface of the second chamber to generate heat, and filled with a second liquid working fluid such that bubbles are caused, by heat, to grow at an interface of a cavity on an inner surface of the second chamber to be heated;
    a connection path to connect the first chamber and the second chamber to each other, the connection path being provided therein with a moving member adapted to isolate the first and second chambers from each other and to move when internal pressure changes according to growth and destruction of the bubbles;

a first subline to connect the connection path to the second chamber such that the first working fluid moves the moving member to one side and is guided to the second chamber according to increase in the internal pressure by growth of the bubbles in the first chamber;

a second subline to connect the connection path to the first chamber such that the second working fluid moves the moving member to the other side and is guided to the first chamber according to increase in internal pressure by growth of the bubbles in the second chamber; and a plurality of cooling means installed on the first subline and the second subline to destroy bubbles produced in the first and second chambers.

2. The microactuator according to claim 1, wherein an opening of the second chamber connected to the first subline and an opening of the first chamber connected to the second subline are provided with a check valve.

3. The microactuator according to claim 1, wherein a plurality of stoppers is provided at both sides of the connection path to prevent the moving member from escaping from the connection path.

* * * * *